(12) United States Patent
Hu et al.

(10) Patent No.: US 11,065,715 B2
(45) Date of Patent: Jul. 20, 2021

(54) COMBINED LIQUID GUIDED LASER AND ELECTRICAL DISCHARGE MACHINING

(71) Applicant: General Electric Company, Schenectady, NY (US)

(72) Inventors: Zhaoli Hu, Greer, SC (US); Abe Denis Darling, Laurens, SC (US); Shamgar Elijah McDowell, Simpsonville, SC (US); Douglas Anthony Serieno, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 565 days.

(21) Appl. No.: 15/145,053

(22) Filed: May 3, 2016

(65) Prior Publication Data
US 2017/0320163 A1 Nov. 9, 2017

(51) Int. Cl.
*B23K 26/00* (2014.01)
*B23H 5/00* (2006.01)
(Continued)

(52) U.S. Cl.
CPC .......... *B23K 26/0093* (2013.01); *B23H 1/00* (2013.01); *B23H 1/04* (2013.01); *B23H 5/00* (2013.01); *B23H 9/14* (2013.01); *B23K 26/146* (2015.10)

(58) Field of Classification Search
CPC .............. B23K 26/0093; B23K 26/146; B23K 26/0853; B23H 1/00; B23H 1/04; B23H 5/00; B23H 9/14
(Continued)

(56) References Cited

U.S. PATENT DOCUMENTS

| 4,762,464 A | * | 8/1988 | Vertz | B23H 9/10 |
| | | | | 219/69.1 |
| 4,808,785 A | * | 2/1989 | Vertz | B23H 9/10 |
| | | | | 219/121.67 |

(Continued)

FOREIGN PATENT DOCUMENTS

| CN | 1658995 A | 8/2005 |
| CN | 102151989 A | 8/2011 |

(Continued)

OTHER PUBLICATIONS

JP Patent Application No. 2017-082458, Office Action dated Mar. 12, 2021, 285664-JP-4, 17 pages.
(Continued)

*Primary Examiner* — Tu B Hoang
*Assistant Examiner* — Masahiko Muranami
(74) *Attorney, Agent, or Firm* — James Pemrick; Hoffman Warnick LLC

(57) ABSTRACT

This disclosure provides a system, method, and resulting workpiece combining liquid guided laser and electrical discharge machining to create a common feature. The workpiece is positioned in a liquid guided laser cutting path and machined by the liquid guided laser device to create an intermediate feature in the workpiece. The work piece is then positioned in an electrical discharge machining (EDM) device so that an electrode of the EDM device is operatively positioned proximate the intermediate feature and machined using the EDM device to modify the intermediate feature in the workpiece to create the finished common feature in the workpiece.

17 Claims, 3 Drawing Sheets

(51) Int. Cl.
  *B23H 9/14* (2006.01)
  *B23K 26/146* (2014.01)
  *B23H 1/00* (2006.01)
  *B23H 1/04* (2006.01)

(58) Field of Classification Search
  USPC ........ 219/69.11, 121.82, 69.2; 700/112, 113, 700/114, 194; 382/151
  See application file for complete search history.

(56) References Cited

U.S. PATENT DOCUMENTS

| | | | |
|---|---|---|---|
| 4,818,834 A | 4/1989 | Rupert | |
| 4,857,696 A * | 8/1989 | Taeusch | B23H 5/00 219/121.7 |
| 5,084,602 A * | 1/1992 | Gamo | B23H 5/00 219/69.12 |
| 5,525,776 A * | 6/1996 | Okamoto | B23K 26/0093 219/121.68 |
| 6,094,793 A * | 8/2000 | Szuba | G05B 19/4083 198/345.3 |
| 6,186,711 B1 * | 2/2001 | Mueller | B44B 3/06 269/292 |
| 6,362,446 B1 | 3/2002 | Jones et al. | |
| 6,897,401 B2 | 5/2005 | Kildea | |
| 8,341,841 B2 | 1/2013 | Fessler-Knobel | |
| 8,618,438 B2 | 12/2013 | Graichen | |
| 2001/0005066 A1 * | 6/2001 | Nordquist | B23H 11/003 269/71 |
| 2004/0200807 A1 * | 10/2004 | Forrester | B23H 7/28 219/69.17 |
| 2005/0173388 A1 * | 8/2005 | Lavers | B23H 9/10 219/121.71 |
| 2007/0205184 A1 * | 9/2007 | Mazumder | B23H 7/04 219/69.17 |
| 2007/0296967 A1 | 12/2007 | Gupta et al. | |
| 2009/0025220 A1 * | 1/2009 | Fessler-Knobel | B23Q 3/063 29/889.7 |
| 2009/0169394 A1 * | 7/2009 | Crow | B23H 9/10 416/96 R |
| 2011/0163078 A1 * | 7/2011 | Fukushima | B23K 26/146 219/121.71 |
| 2011/0185572 A1 | 8/2011 | Wei et al. | |
| 2012/0301319 A1 * | 11/2012 | Lacy | F01D 5/186 416/97 R |
| 2013/0206739 A1 | 8/2013 | Reed et al. | |
| 2014/0076868 A1 * | 3/2014 | Hu | B23K 26/16 219/121.72 |
| 2014/0097157 A1 | 4/2014 | Bolms | |
| 2015/0273625 A1 * | 10/2015 | Mabee | B23K 26/083 219/121.82 |

FOREIGN PATENT DOCUMENTS

| | | |
|---|---|---|
| CN | 102235183 A | 11/2011 |
| CN | 102528413 A | 7/2012 |
| CN | 102797508 A | 11/2012 |
| CN | 104100308 A | 10/2014 |
| CN | 102434287 A | 5/2015 |
| CN | 104907650 A | 9/2015 |
| JP | 2985004 B2 | 11/1999 |
| JP | 2009162224 A | 7/2009 |
| JP | 2011140036 A | 7/2011 |
| JP | 2010285919 A | 12/2012 |
| JP | 2013047479 A | 3/2013 |

OTHER PUBLICATIONS

CN Patent Application No. 201710306344.9 Office Action dated Dec. 16, 2019, 15 pages.
CN Patent Application No. 201710306344.9 Office Action dated Oct. 10, 2020, 15 pages.

* cited by examiner

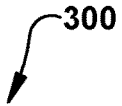

| | LGL Only | EDM Only | LGL + EDM |
|---|---|---|---|
| Coating | Yes | No | Yes |
| Surface Feature Shape | > Complexity Threshold | < Complexity Threshold | > Complexity Threshold |
| Feature Size | < EDM Size Threshold < LGL Size Efficiency Threshold | > EDM Size Threshold > LGL Size Efficiency Threshold | > EDM Size Threshold |
| Feature Depth | < EDM Efficiency Threshold | > EDM Efficiency Threshold | Change at EDM Efficiency Threshold |
| Feature Drill Path | > Working Distance Threshold | Curved Drill Path | Change as Needed |

Fig. 3

COMBINED LIQUID GUIDED LASER AND ELECTRICAL DISCHARGE MACHINING

BACKGROUND

The disclosure relates generally to machining a metal workpiece, and more particularly, using liquid guided laser and electrical discharge machining tools on a common workpiece.

Industrial cutting tools combining a high energy laser beam with a focused jet of transparent liquid, such as water, have been in use for a number of years. These systems generally comprise a laser and a beam guide providing the laser beam, an optics module for controllably focusing the laser, a coupling assembly for coupling the laser with a high pressure liquid jet, and a discharge nozzle. Liquid guided lasers are effective for machining very hard materials, but may have limitations on depth of small hole drilling and non-line-of-sight holes.

Industrial cutting tools based on electrical discharge machining (EDM) have also been used for machining various workpieces, including difficult to work materials like hardened steels and alloys, for many years as well. EDM uses an electrode to create an electrical discharge or spark to a workpiece that removes small amounts of material, generally with the assistance of a dielectric fluid. One application of EDM is the drilling of rows of small holes in the leading and/or trailing edges of turbine blades. The very hard alloys used in turbine blades makes conventional machining of holes with high aspect ratio extremely difficult. EDM drilling can enable fast drilling of small, deep holes in such materials. However, EDM has limitations in efficiency and precision for small and complex features, as well as difficulty removing the thermal barrier coating (TBC) on turbine blades and similar workpieces that employ TBCs.

SUMMARY

A first aspect of this disclosure provides a method of machining a workpiece. The method comprises positioning the workpiece in a liquid guided laser cutting path and using the liquid guided laser to liquid guided laser machine the workpiece to create at least one intermediate feature in the workpiece. The workpiece is then positioned in an electrical discharge machining (EDM) device and an electrode of the EDM device is operatively positioned proximate the at least one intermediate feature in the workpiece. Electrical discharge machining is then used on the workpiece using the EDM device to modify the at least one intermediate feature in the workpiece to create at least one finished feature in the workpiece.

A second aspect of the disclosure provides a workpiece machined by a combination of liquid guided laser machining and EDM machining. The workpiece comprises a base material and at least one finished feature in the base material. The finished features is created by positioning the workpiece in a liquid guided laser cutting path, liquid guided laser machining the workpiece to create at least one intermediate feature in the workpiece, positioning the workpiece in an EDM device, and electrical discharge machining the workpiece using the EDM device to modify the at least one intermediate feature in the workpiece to create the at least one finished feature in the workpiece. For the electrical discharge machining, an electrode of the EDM device is operatively positioned proximate the at least one intermediate feature in the workpiece.

A third aspect of the disclosure provides a system for combining a liquid guided laser device and an EDM device. The system comprises a liquid guided laser device with a liquid guided laser cutting path and an EDM device with an electrode. It further comprises a first positioning system for positioning a workpiece in the liquid guided laser cutting path for creating at least one intermediate feature by machining the workpiece with the liquid guided laser device, and a second positioning system for positioning the workpiece such that the electrode of the EDM device is operatively positioned proximate the at least one intermediate feature in the workpiece to modify the at least one intermediate feature to create at least one finished feature in the workpiece. The workpiece is transferred between the first positioning system and the second positioning system with a common reference to be used by the first positioning system and the second positioning system to provide alignment between at the least one intermediate feature and the at least one finished feature in the workpiece.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 3 shows an example table for determining the process or processes used for each feature of a common design in accordance with an embodiment of the invention.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
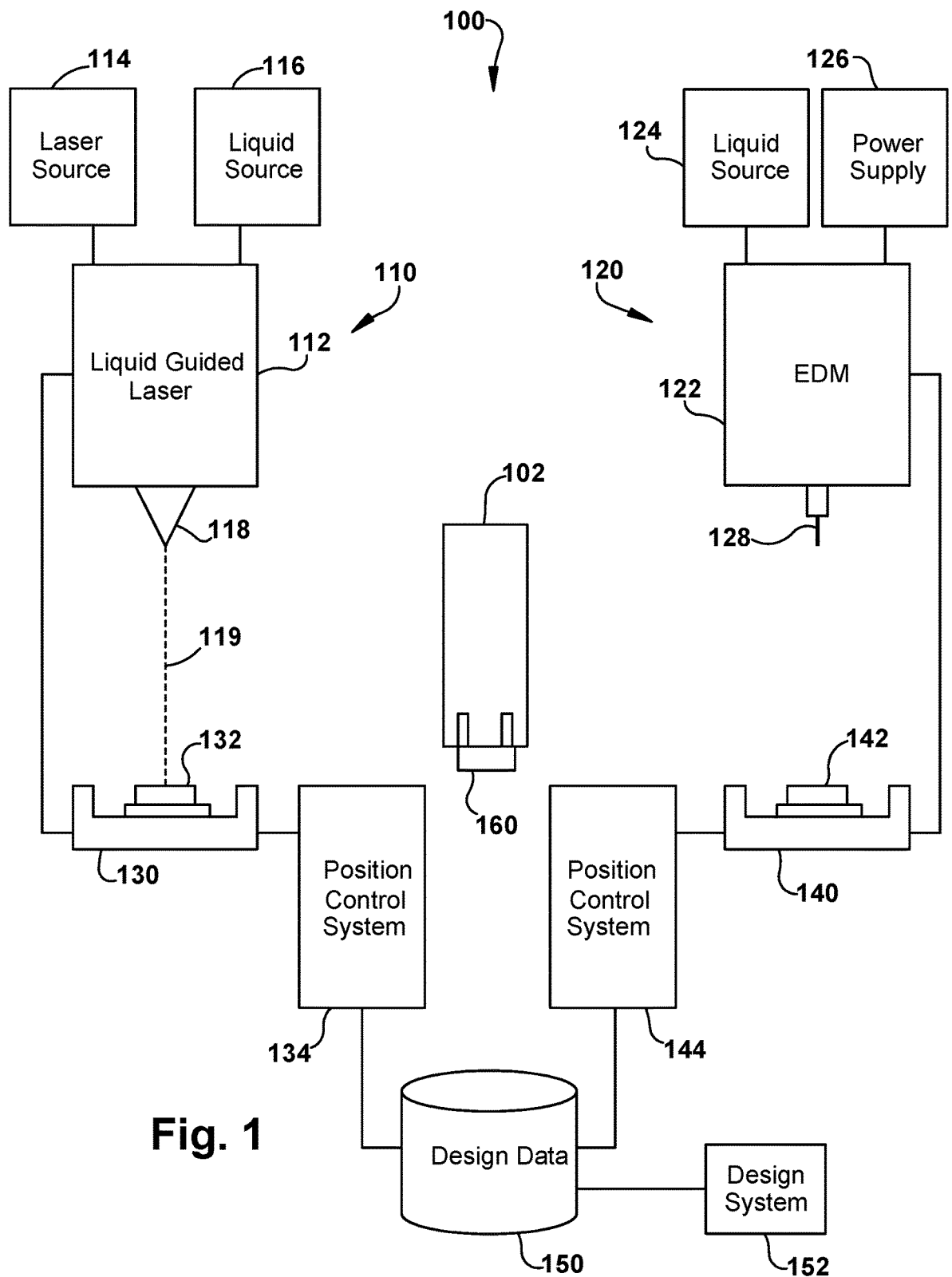
FIG. 1 shows block diagram of an example system in accordance with an embodiment of the invention.

As indicated above, the disclosure provides a methods, systems, and resulting workpieces using liquid guided laser and electrical discharge machining tools on a common workpiece. Liquid guided laser machining has a number of advantageous characteristics. It is capable of reliably machining through coating layers, such as thermal barrier coatings (TBC), as well as base materials. It leaves very little recast and no burrs and is capable of avoiding back strikes. It can drill very small diameter holes with little taper and can machine shaped holes and features, such as surface diffuser shapes, chevrons, square in, square out, etc. It is also more tolerant than other methods of distance variations from the tool to the workpiece. In current implementations, it is faster than Electrical discharge machining (EDM) for very shallow features (<0.5 inches) and comparable up to some threshold depth. However, at and above this threshold depth, EDM becomes more efficient and, above a certain depth, liquid guided laser becomes incapable. Similarly, liquid guided laser is very effective at small diameters, but ceases to be cost effective above a certain threshold diameter, where EDM is more effective. In addition to deep or large features, EDM has some additional capabilities achieved through shaping of the electrode and is not limited by a straight laser guide path.

By combining these techniques and tools, workpiece designs can relax the post-coating reopening process. Diffuser shapes and cooling holes can be created in a common process. Design flexibility and efficiency may be maximized by choosing the most efficient combination of drilling speed and feature shape capabilities. Differences in the material limitations, working distances, and accessibility of the two techniques can be overcome in some combinations. For example, liquid guided laser may be used to machine into the base metal to allow EDM have enough room to get realigned into a feature, with less risk of touching TBC surface.

A challenge addressed in some embodiments of the invention is the effective combination of liquid guided laser and EDM techniques on a common workpiece, and, more specifically, the development of a common design leveraging the capabilities of the two techniques for single features using liquid guided laser to create an intermediate feature and EDM to finish the feature. An intermediate feature is a feature that does not meet the final specifications for the finished workpiece and, instead, has an intermediate specification that is different than the specification of the finished feature. For example, an intermediate feature might be a hole that is drilled to a depth of 0.5 inches, including removal of a surface coating layer, with a liquid guided laser, where the finished feature will be 1 inch hole finished by EDM machining.

A further challenge addressed in some embodiments of the invention is the difficulty of accurately and efficiently aligning the features of a common design on separate machines, in particular those features that use both techniques. While a common positioning system compatible with both liquid guided laser and EDM tools may be possible, these tools are more commonly provided by different vendors and may require the workpiece to be physically moved between separate tools and dedicated positioning systems.

FIG. 1 shows a combined system 100 for machining a common workpiece 102 using a liquid guided laser device 110 and an EDM device 120. In the combined system 100 shown, the liquid guided laser device 110 and the EDM device 120 are separate machines with their own position control systems and share only a common interface to the workpiece and the common ability to receive complementary design data. In alternate configurations (not shown), greater integration between the components of the two devices may be achieved, such as common stages, position control systems, data systems, or supplies. FIG. 1 is a block schematic only and intentionally excludes many details of the devices, such as cabinets, user controls/interfaces, and other components conventionally available on such commercial systems and familiar to those of ordinary skill in the art.

The liquid guided laser device 110 includes a liquid guided laser system 120 that receives laser energy from a laser source 114 and liquid from a liquid source 116. The liquid guided laser system 110 focuses the laser energy from the laser source 114 into a beam and pushes liquid from the liquid source 116 through a nozzle 118 to form a liquid guided laser beam along a liquid guided laser beam path 119. The liquid column, generally a water jet, acts as a laser guide, similar to the principles of fiber optics, and directs the laser energy at the workpiece, while also providing a moving media for continuously flushing debris from the workpiece.

In FIG. 1, the workpiece 102 has not yet been positioned in the liquid guided laser path 119, as it would be during machining.

The EDM device 120 includes an EDM system 122 that receives dielectric liquid from a liquid source 124 and electrical energy from a power supply 126. The EDM system 120 provides dielectric liquid, generally water, to the surface of the workpiece while driving high energy pulses through the electrode 128 to create a spark between the electrode 128 and the workpiece and thereby remove material. This requires close proximity between the electrode 128 and the location on the workpiece being machined. In FIG. 1, the workpiece 102 has not yet been positioned in proximate the electrode 128, as it would be during machining.

The liquid guided laser device 110 is compatible with and interfaced to a stage 130 with a chuck 132 for positioning and retaining the workpiece 102 during machining by the liquid guided laser device 110. The liquid guided laser device 110 and the stage 130 are held and moved in relation to one another by a computer-based position control system 134. In the embodiment shown, the position control system 134 is connected to the stage 130 and through the stage 130 to the liquid guided laser system 112. Other configurations and interconnections are possible. The position control system 134 is configured to position and move the workpiece with high precision in the X, Y, and Z dimensions, X and Y generally referring to the lateral position of the workpiece and Z generally referring to distance from the nozzle 118 to the target surface of workpiece along the liquid guided laser path 119. Note that these directions are relative and, in some embodiments, it may be the liquid guided laser 112, the stage 130, or the chuck 132, or any and all of them that move through vertical and lateral actuation and/or rotation in various directions to properly position the workpiece relative to the liquid guided laser path 119 to achieve the desired point and direction of contact for the desired feature location, shape, and depth. In one embodiment, the chuck 132 and the position control system 134 are selected from a platform machine positioning system that is compatible with multiple machine tools.

The EDM device 120 is compatible with and interfaced to a stage 140 with a chuck 142 for positioning and retaining the workpiece 102 during machining by the EDM device 120. The EDM device 120 and the stage 140 are held and moved in relation to one another by a computer-based position control system 144. In the embodiment shown, the position control system 144 is connected to the stage 140 and through the stage 140 to the EDM system 122. Other configurations and interconnections are possible. The position control system 144 is configured to position and move the workpiece with high precision in the X, Y, and Z dimensions, X and Y generally referring to the lateral position of the workpiece and Z generally referring to distance from the electrode 128 to the target surface of workpiece. Note that these directions are relative and, in some embodiments, it may be the EDM system 122, the stage 140, the chuck 142, or any and all of them that move through vertical and lateral actuation and/or rotation in various directions to properly position the workpiece relative to the electrode 128 to achieve the desired point and direction of contact for the desired feature location, shape, and depth. In one embodiment, the chuck 142 and the position control system 144 are selected from a platform machine positioning system that is compatible with multiple machine tools and it is the same type of platform machine positioning system as the chuck 132 and the position control system 134 for the liquid guided laser device 110.

In order to be able to machine features on the same workpiece with a high level of control of their relative position, some embodiments of the invention use a common set of design data 150 and an adapter 160 for the chucks 132 and 142 that attaches to the workpiece 102 and provide a consistent reference for positioning both tools. For example, each of the chucks 132 and 142 may provide a common mounting device for each machine and the adapter 160 may be a pallet that fixedly attaches to the workpiece 102 throughout the machining process and travels with the workpiece as a unit between machines. The adapter 160 provides a repeatable system for locating critical surfaces of the workpiece. In one embodiment, the adapter 160 removably clamps to a portion of the workpiece 102 to locate the workpiece in a rigid manner and provides a location of the workpiece 102 within the small workspace of machine travel. The adapter 160 may enable an irregular workpiece geometry to adapt easily to a standard chuck format and, in some embodiments, is a custom fixture developed for a particular part of family of parts for repeated use. The adapter 160 provides a standard orientation and position of the workpiece 102 such that based on a common reference point on the workpiece 102, both position control systems 134, 144 can use a common starting point find, calculate, and manipulate the position of the workpiece 102 in their respective machines. For example, in one embodiment, the workpiece 102 is probed by the position control system 134 for the liquid guided laser device 110 and a coordinate shift is calculated and recorded to the common design data 150 or otherwise communicated to the position control system 144 for the EDM device 120.

In order for the common reference (or references) that can be used by both position control systems 134, 144, a common set of design data may be provided to accurately map all features and their specification onto a single workpiece design, even though two separate machines will be used for the actual machining. Once these features are mapped and their relative positions and specifications are determined for a given common design, each feature can be evaluated for whether it should be produced on the liquid guided laser device 110, the EDM device 120, or a combination thereof. In the case of combination features, the specification is split into an intermediate feature specification for the first device being used (generally the liquid guided laser device 110) with a target position, shape, and depth, and a final feature specification which includes the target position shape, and depth for a finishing feature that will create a finished feature with the desired specification. Once the common design data 150 is generated, it can then be separated into complementary sets of featured specifications for the respective machines, along with the common reference data. For example, the liquid guided laser specifications from the common design data 150 may include a number of features that are created solely by the liquid guided laser device 110 and a number of intermediate features that are created by the liquid guided laser device 110 for completion by the EDM device 120. The EDM specifications from the common design data 150 may include a number of features that are created solely by the EDM device 120 and a number of finishing features for starting from a position within an intermediate feature created by the liquid guided laser device 110 to complete the finished feature in the common design. Note that for some workpieces and design applications, it may be possible to reverse the order of the liquid guided laser features and the EDM features or to have combined features that require multiple iterations between the two machines for completion. For example, it may be possible to use the EDM device 120 to produce a large intermediate feature, move to the liquid guided laser device 110 for producing a second intermediate feature within the first intermediate feature with a complex shape, then moving back to the EDM device 120 for drilling a long hole within the second intermediate feature to produce a complex finished feature. In one embodiment, the combined design for the design data 150 and the separation of features into liquid guided laser specification and EDM specifications is accomplished on a separate design system, such as design system 152, with a remote connection to a common repository for the design data 150. In another embodiment, the design data 150 is created on the design system 152 and placed on removable media compatible with the position control systems 134, 144 and moving through the process with the workpiece 102 and adapter 160.

Figure 2:
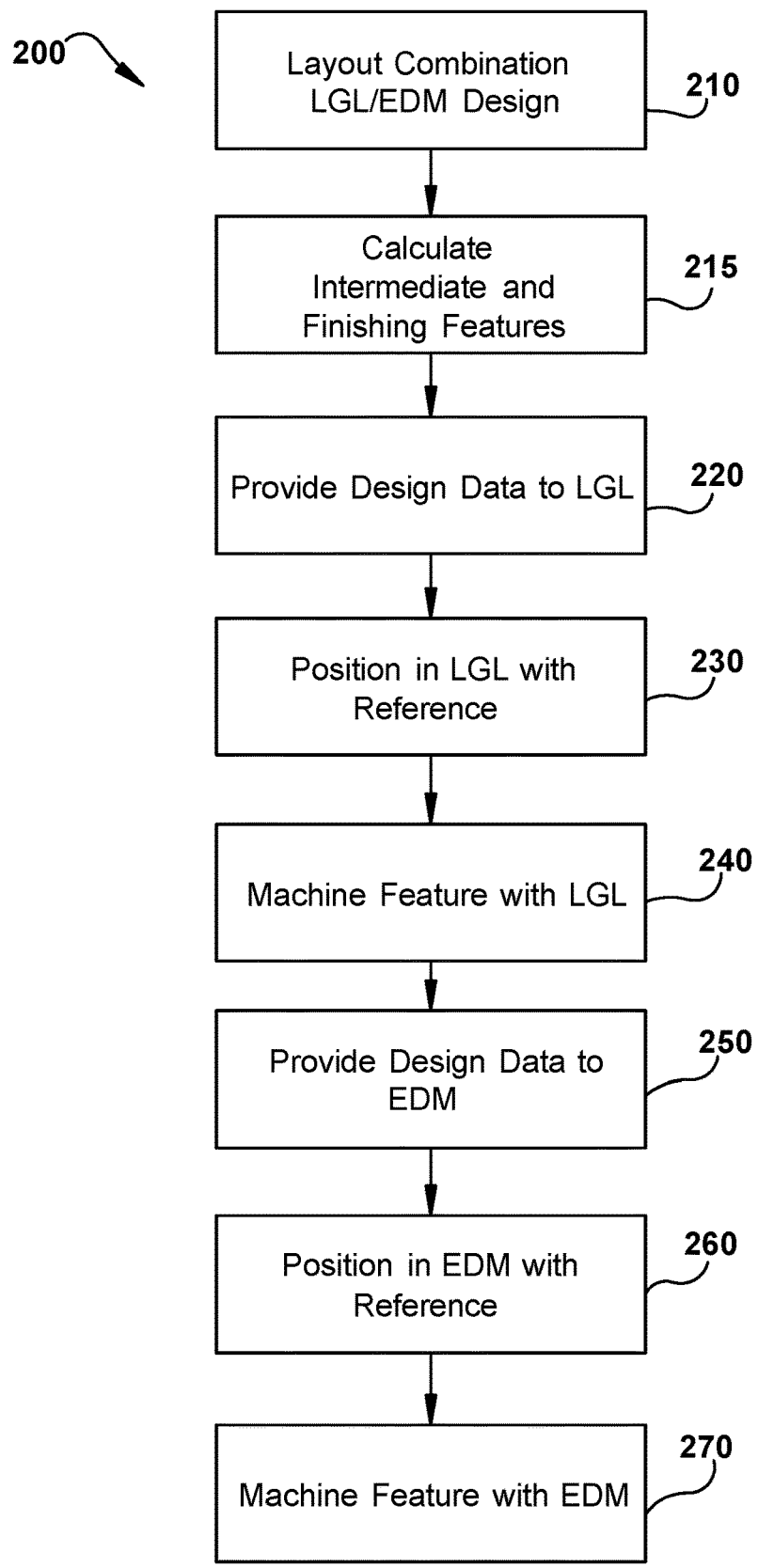
FIG. 2 shows a block diagram of an example method in accordance with an embodiment of the invention.

FIG. 2 is a block diagram of an example method 200, such as a method using combined system 100 from FIG. 1. In step 210, the combination feature layout for the common liquid guided laser (LGL) and EDM design is prepared to represent all finished features in the finished workpiece and each features is identified by process as LGL, EDM, or combined LGL/EDM using a variety of design and process efficiency considerations (see FIG. 3). In step 215, intermediate and finishing features are calculated for each feature that requires combined LGL/EDM machining. In step 220, the design data, including the common reference, the LGL only features, and the LGL intermediate features, is provided to the position control system for the LGL device. In step 230, the LGL device is positioned using the common reference data and the reference point provided by the workpiece and/or adapter. In step 240, the LGL only and LGL intermediate features are machined by the LGL device based on the LGL design data and the positions and operational specifications calculated from the LGL design data, reference position, and the position control system for the LGL device. In step 250, the design data, including the common reference, the EDM only features, and the EDM finishing features, is provided to the position control system for the EDM device. In step 260, the EDM device is positioned using the common reference data and the reference point provided by the workpiece and/or adapter. In step 270, the EDM only and EDM finishing features are machined by the EDM device based on the EDM design data and the positions and operational specifications calculated from the EDM design data, reference position, and the position control system for the EDM device.

FIG. 3 is an example table 300 of criteria for classifying features in a combination design as LGL only, EDM only, or combined LGL/EDM features. This is an example only and such design considerations will change over time as machine and process capabilities change, as well as based upon the type of workpiece and variety of special considerations for its geometry, features, materials, coatings, etc. These criteria may also take into consideration more general manufacturing efficiency criteria, such as machine availability, reliability, feature tolerances, and other considerations. In the table 300, the first data row refers to the presence of a coating over the base material requires the use of either LGL or LGL+ EDM if a coating is present. In the second data row, the complexity of the surface feature shape is considered. A complexity threshold is set based on the relative capabilities of LGL versus EDM. For shapes that are over this complexity threshold, LGL or LGL+EDM is required, since EDM becomes non-capable for more complex shapes. Feature size, generally referring to diameter, is considered in the third data row. There is an EDM size threshold below which EDM is not capable and LGL only is the only option. However, there is also an LGL size efficiency threshold, over which LGL is an inefficient method. Between these two thresholds LGL, EDM, or LGL+EDM are all options. Above the LGL size efficiency threshold, EDM only or LGL+EDM are the only options. In the fourth data row, feature depth is considered. In the example shown, only the efficiency threshold between LGL being faster or equivalent or EDM being faster is considered. In this example, depth of the feature drives the preference of which method is used if all three options are available. Short holes would be drilled with LGL only. Long holes would be drilled with EDM only. However, if other features specifications, like the presence of a coating or complex surface shape, LGL+EDM would be preferred with the intermediate feature having a depth near the EDM efficiency threshold for changing between the two processes. The final data row relates to the drill path for a feature and captures the general concept that there may be other considerations in the process capabilities that drive decision-making. In this example, LGL has a longer and more forgiving working distance threshold. So, depending on the overall shape of the workpiece, positioning system, heads of the respective tools, and/or structures that may prevent a tool getting close to a particular feature location, LGL may be the only option. While EDM requires proximity, some embodiments also have the ability to use a shaped electrode to reach feature locations that may be difficult with the straight LGL beam path. With LGL and EDM combined, a design could consider the use of LGL to remove surface coating or start a feature, but where change to a shaped electrode in the EDM is necessary to complete the feature. As stated above, this table is an example only and the full design criteria that would be used to assign specific features to LGL only, EDM only, or combined LGL/EDM, as well as setting the actual specifications of the intermediate features, could be a complex process.

The foregoing drawings show some of the operational processing associated according to several embodiments of this disclosure. It should be noted that in some alternative implementations, the acts described may occur out of the order described or may in fact be executed substantially concurrently or in the reverse order, depending upon the act involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
   a liquid guided laser device with a liquid guided laser cutting path;
   an electrical discharge machining (EDM) device with an electrode;
   a first positioning system including a movable first stage and a first chuck for positioning and moving a workpiece in the liquid guided laser cutting path for creating at least one intermediate feature by machining the workpiece with the liquid guided laser device;
   a second positioning system including a movable second stage and a second chuck for positioning and moving the workpiece such that the electrode of the EDM device is operatively positioned proximate the at least one intermediate feature in the workpiece to modify the at least one intermediate feature to create at least one finished feature in the workpiece;
   an adapter including a pallet removably clamped to the workpiece and releasably coupled to the first positioning system and the second positioning system, the adapter providing a standard orientation and a standard position of the workpiece when releasably coupled to the first positioning system and the second positioning system,
   wherein the adapter and an attached workpiece are transferred between the first positioning system and the second positioning system, with a common reference of the workpiece to be used by the first positioning system and the second positioning system to provide alignment between at the least one intermediate feature and the at least one finished feature in the workpiece; and
   wherein machining is performed by at least one of:
      the liquid guided laser device and the EDM device;
      alternating between the liquid guided laser device to the EDM device and then to the liquid guided laser device; or
      alternating between the EDM device to the liquid guided laser device and then to the EDM device;
   a common set of design data including position, shape, and depth specifications provided to the liquid guided laser device, the EDM device, the first positioning system, and the second positioning system, respectively, the common set of design data including data relating to:
      the common reference of the workpiece,
      the at least one intermediate feature in the workpiece, and
      the at least one finished feature in the workpiece,
   wherein the first positioning system and the liquid guided laser device machine the at least one intermediate feature in the workpiece in accordance with the common set of design data using the common reference of the workpiece, the common set of design data is calculated by the first positioning system for a shift in the common reference and communicated to the second positioning system, and the second positioning system and the EDM device machine the at least one finished feature in the workpiece in accordance with the common set of design data using the common reference of the workpiece, and
   wherein the at least one intermediate feature in the workpiece is a hole and the liquid guided laser device machines the hole to an intermediate depth and the EDM device machines the hole to a finished depth to create the at least one finished feature in the workpiece in accordance with the common set of design data.

2. The system of claim 1, wherein the workpiece further comprises a base material and a thermal barrier coating with a coating depth, and
wherein the liquid guided laser device machines the at least one intermediate feature to a depth greater than the coating depth and the EDM device removes only the base material in creating the at least one finished feature in the workpiece in accordance with the common set of design data.

3. The system of claim 1, wherein the liquid guided laser cutting path is a straight line and the electrode of the EDM device is shaped, whereby the at least one finished feature in the workpiece includes a first portion that follows a straight path and a second portion that follows a path corresponding to the shaped electrode of the EDM device.

4. The system of claim 1, wherein the intermediate depth of the hole is less than an EDM efficiency threshold and the finished depth of the hole is greater than the EDM efficiency threshold.

5. The system of claim 1, wherein the second positioning system positions the workpiece such that the electrode of the EDM device is operatively positioned inside the at least one intermediate feature in the workpiece.

6. The system of claim 1, wherein the at least one finished feature of the workpiece includes a plurality of finished features, a portion of the plurality of finished features created using only the liquid guided laser device.

7. The system of claim 6, wherein the portion of the plurality of finished features is a diffuser shape.

8. The system of claim 1, wherein:
the first positioning system includes:
the first stage;
the first chuck positioned on the first stage; and
a first position control system in communication with the first stage, the first position control system configured to move the first stage to create the at least one intermediate feature by machining the workpiece with the liquid guided laser device; and
the second positioning system includes:
the second stage;
the second chuck positioned on the second stage; and
a second position control system in communication with the second stage, the second position control system configured to move the second stage to modify the at least one intermediate feature to create the at least one finished feature in the workpiece using the EDM device.

9. The system of claim 8, wherein the adapter is releasably coupled to the first chuck of the first positioning system and the second chuck of the second positioning system.

10. A system comprising:
a liquid guided laser device with a liquid guided laser cutting path;
an electrical discharge machining (EDM) device with an electrode;
a first positioning system including a movable first stage and a first chuck for positioning and moving a workpiece in the liquid guided laser cutting path for creating at least one intermediate feature by machining the workpiece with the liquid guided laser device;
a second positioning system including a movable second stage and a second chuck for positioning and moving the workpiece such that the electrode of the EDM device is operatively positioned proximate the at least one intermediate feature in the workpiece to modify the at least one intermediate feature to create at least one finished feature in the workpiece;
an adapter including a pallet removably clamped to the workpiece and releasably coupled to the first positioning system and the second positioning system, the adapter providing a standard orientation and a standard position of the workpiece when releasably coupled to the first positioning system and the second positioning system,
wherein the adapter and an attached workpiece are transferred between the first positioning system and the second positioning system with a common reference of the workpiece to be used by the first positioning system and the second positioning system to provide alignment between at the least one intermediate feature and the at least one finished feature in the workpiece; and
wherein machining is performed by at least one of:
the liquid guided laser device and the EDM device;
alternating between the liquid guided laser device to the EDM device and then to the liquid guided laser device; or
alternating between the EDM device to the liquid guided laser device and then to the EDM device;
a common set of design data including position, shape, and depth specifications provided to the liquid guided laser device, the EDM device, the first positioning system, and the second positioning system, respectively, the common set of design data including data relating to:
the common reference of the workpiece,
the at least one intermediate feature in the workpiece, and
the at least one finished feature in the workpiece,
wherein the first positioning system and the liquid guided laser device machine the at least one intermediate feature in the workpiece in accordance with the common set of design data using the common reference of the workpiece, the common set of design data is calculated by the first positioning system for a shift in the common reference and communicated to the second positioning system, and the second positioning system and the EDM device machine the at least one finished feature in the workpiece in accordance with the common set of design data using the common reference of the workpiece.

11. The system of claim 10, wherein the at least one intermediate feature in the workpiece meets an intermediate specification, distinct from a final specification, of the workpiece, the intermediate specification defined by the common set of design data.

12. The system of claim 11, wherein the at least one finished feature in the workpiece meets the final specification of the workpiece, the final specification defined by the common set of design data.

13. The system of claim 10, wherein the liquid guided laser cutting path is a straight line and the electrode of the EDM device is shaped,
wherein the at least one finished feature in the workpiece includes a first portion that follows a straight path and a second portion that follows a path corresponding to the shaped electrode of the EDM device.

14. The system of claim 10, wherein the workpiece further comprises a base material and a thermal barrier coating with a coating depth, and
wherein the liquid guided laser device machines the at least one intermediate feature to a depth greater than the coating depth and the EDM device removes only the base material in creating the at least one finished feature in the workpiece in accordance with the common set of design data.

15. The system of claim 10, wherein the second positioning system positions the workpiece such that the electrode of the EDM device is operatively positioned inside the at least one intermediate feature in the workpiece.

16. The system of claim 10, wherein:
the first positioning system includes:
   the first stage;
   the first chuck positioned on the first stage; and
   a first position control system in communication with the first stage, the first position control system configured to move the first stage to create the at least one intermediate feature by machining the workpiece with the liquid guided laser device; and
the second positioning system includes:
   the second stage;
   the second chuck positioned on the second stage; and
   a second position control system in communication with the second stage, the second position control system configured to move the second stage to modify the at least one intermediate feature to create the at least one finished feature in the workpiece using the EDM device.

17. The system of claim 16, wherein the adapter is releasably coupled to the first chuck of the first positioning system and the second chuck of the second positioning system.

* * * * *